United States Patent [19]

Balyko et al.

[11] 4,093,131
[45] June 6, 1978

[54] MACHINE FOR WINDING TAPE BODY INSULATION ON POLE COILS OF ELECTRIC MACHINES

[76] Inventors: Georgy Semenovich Balyko, ulitsa Sharikovskaya, 47, kv. 37; Nikolai Stepanovich Bubela, ulitsa Mira, 114, kv. 69, both of Kharkov, U.S.S.R.

[21] Appl. No.: 723,651

[22] Filed: Sept. 15, 1976

[30] Foreign Application Priority Data

Dec. 8, 1975 U.S.S.R. .............................. 2198844
Dec. 15, 1975 U.S.S.R. .............................. 2302883
Mar. 15, 1975 U.S.S.R. .............................. 2331578

[51] Int. Cl.² .......................................... H01F 41/12
[52] U.S. Cl. .................................... 242/6; 242/4 BE
[58] Field of Search .............. 242/6, 4 R, 4 BE, 4 B; 156/443, 428; 29/203 R, 605

[56] References Cited

U.S. PATENT DOCUMENTS

| | | | |
|---|---|---|---|
| 2,254,934 | 9/1941 | Brown | 242/6 |
| 2,704,637 | 3/1955 | Redlich | 242/4 B |
| 2,793,817 | 5/1957 | Clarke | 242/4 B |

*Primary Examiner*—Billy S. Taylor
*Attorney, Agent, or Firm*—Lackenbach, Lilling & Siegel

[57] ABSTRACT

A machine for winding tape body insulation on the pole coils of electric machines includes, according to the invention, a frame made of two parts, one of which is rigidly fixed on a foundation, and the other is movable relative to the stationary part by means of an overhang. The overhang is hinged on a support fixed to the stationary part of the frame, whereon an electric drive is also located. The drive is kinematically interconnected with the shaft of a driving gear that drives a device for winding tape insulation on the pole coils, the device being mounted on the frame and carrying the insulating tape. The winding device is made in the form of two toothed half-rings detachable from each other and mounted on the stationary and movable parts of the frame, respectively. The machine of the present invention has the capability of winding coils with several tapes, both dry and adhesive, simultaneously and it also allows the placing and removal of pole coils to be mechanized. This results in a substantially improved quality of the insulation applied to the pole coils of electric machines.

8 Claims, 9 Drawing Figures

MACHINE FOR WINDING TAPE BODY INSULATION ON POLE COILS OF ELECTRIC MACHINES

The present invention relates to the production equipment for components of electric machines, and, more particularly, to a machine for winding tape body insulation on the pole coils of electric machines which is mainly used to wind tape insulation on pole coils, but can also be employed for winding thread on parts similar in shape to the pole coils of electric machines.

In the known winding machines, the pole coils to be wound are placed on and removed from the machine through a narrow slit in the winding device, which results in an unsuitable loading and in a damaged insulating layer. Said machines do not have the capability of winding pole coils with adhesive tape or several tapes simultaneously. The known machines for winding tape body insulation on pole coils have no devices for tensioning the insulating tape during the process of winding a pole coil. As a result swells and creases arise on the insulating layer, which leads to a reduced electric strength of insulation.

Known in the art are machines for applying tape body insulation to the pole coils of electric machines having a frame, whose upper surface mounts a winding head, and a drive kinematically linked with a gear shuttle located inside the body of the winding head. The upper surface of the frame is used as a support for the coil which is moved through a predetermined pitch along the frame's surface manually by the operator.

As the coil to be insulated is moved in operation, its insulating layer continuously slides along the surface of the frame, and this results in the insulation being damaged and being contaminated from foreign particles accumulated on the frame's surface. Because of its rising tension, the insulating tape repeatedly goes up and falls down onto the frame surface, which leads to poor quality of insulation. The winding of the coils with adhesive tapes is not practicable on the machines of the above type since the tape's adhesion and subsequent detachment from the frame surface, which will damage the insulation, will occur during the coil's displacement along the table.

Also known in the art are machines for winding tape or thread on pole coils wherein the winding device is mounted on self-adjusting supports on the upper surface of the frame and is moved around the contour of the pole coil being wound by means of a template made in the form of a rack.

In such machines, the winding devices are provided with mechanisms for braking the tape, which, however do not eliminate the slack in the tape during its winding on the coil. This results from the complex shape of a pole coil, where the center of the core is out of alignment with the rotation center of the winding device. In this case, the insulating tape becomes slack at its separate portions, which leads to swells and creases on the insulating layer. Swells and creases enlarge the cross-section area of the wound pole coil and worsen the quality of insulation. The tape's slack results in non-uniform tension and makes for more frequent breakages of the tape.

Machines for applying tape insulation are known wherein the winding device is mounted on a toothed disc having a slit for introducing the coil to be wrapped. A tape bobbin holder is mounted on a shaft secured to a plate. Mounted on the same plate but on another shaft is a rocking lever, whereon a follower roller and a spring brake are placed. Another lever, also spring-loaded and provided with a roller moving along the insulating tape, is used to make up for the slack in the tape. When the tape becomes slack, the spring-loaded lever swings at a certain angle, thus eliminating the slack.

Such a construction of the winding device allows the tape's slack to be eliminated only where non-adhesive tapes are employed and cannot be used for adhesive insulating tapes. Since the follower and the tensioning rollers are in direct contact with the tape's surface, they become covered with varnish and cause damage to the tape where adhesive tapes are used. As a result, the quality and reliability of insulation are decreased. Furthermore, several bobbins for applying insulation with two or more insulating tapes simultaneously are usually mounted in the described devices. Placing the spring-loaded levers with rollers in the spatially confined internal zone of the winding device results in a cumbersome construction and in inconvenient handling.

Known in the art is a machine for winding insulating tape on the pole coils of electric machines, which includes a frame fixed on a foundation, an electric drive mounted on the frame and kinematically interconnected with the shaft of a driving gear, a winding device carrying the insulating tape, a unit for holding the coil in position, and a unit for rotation of the coil kinematically interconnected with the electric drive.

In said machine, the insulating tape is wound by means of a winding and shuttle ring provided with a slit to receive the coil therethrough. The insulating tape goes from a bobbin and is wound upon the periphery of the shuttle in the amount required to wrap one coil and is then cut off. In rotation of the shuttle, the tape wound thereon moves upon guide rollers and is wrapped on the coil core with a predetermind pitch. During the applying of the insulation, the coil is moved relative to the shuttle by hand or by a power drive. The machine has no device for tensioning the tape to eliminate the slack during the process of winding and it cannot provide for the winding of adhesive tapes or several tapes simultaneously. In addition, placing and removal of the coil to be wound are very inconvenient due to the design of the device.

It is an object of the present invention to provide a machine for winding tape body insulation on the pole coils of electric machines, which ensures a high quality of the insulation applied.

Another object of the invention is to provide for the winding on pole coils of several insulating tapes simultaneously.

A further object of the invention is to provide suitable loading of a pole coil on the machine and suitable removal after the insulation is applied.

Still another object of the invention is to provide for the winding of adhesive tapes on the coils.

These objects are accomplished by a machine for winding tape body insulation on the pole coils of electric machines, which includes a frame fixed on a foundation and carrying an electric drive kinematically interconnected with the shaft of a driving gear; a winding device mounted on the frame and carrying the insulating tape; a unit for holding the pole coil in position; and a unit for rotation of the pole coil kinematically interconnected with said electric drive. According to the invention, the winding device is made of two toothed half-rings detachable from each other. The frame is made of a stationary part and a movable part, the stationary part being rigidly fixed on the foundation and the movable part being adapted to be moved relative to the stationary part by means of an overhang hinged on a support fixed to the stationary part of the frame, and there being provided a locking device for holding said stationary and movable parts of the frame together while the winding of the insulating tape is in progress, the locking device being mounted on one of said parts of the frame and interacting with the other part thereof. A yoke-shaped traverse is provided on which is placed one of the rotatable toothed half-rings, said traverse being mounted on said movable part of the frame and being adapted to be displaced thereon, the first of said half-rings being rotatably mounted on the traverse. A pair of rollers are mounted on said traverse and are intended to interact with the first toothed half-ring. Two devices for locking their respective toothed half-rings once the winding of insulating tape on the pole coil is completed are placed on the stationary part and the movable part of the frame. A pair of rollers are mounted on the stationary part of the frame, one roller of this pair of rollers being mounted on the shaft of the driving gear, the second toothed half-ring being adapted to rotate on said second pair of rollers. At least one bobbin carrying insulating tape, one pin for each bobbin, is mounted on the face surface of the toothed half-rings, the bobbins being rotatably mounted on the respective pins.

It is desirable that an air-operated power cylinder with a piston rod connected to the yoke-shaped traverse be mounted on the movable part of the frame so as to move the traverse thereon.

It is expedient that the locking device for holding the movable and the stationary parts of the frame together include a projection made on a face surface of the frame's movable part, this projection fitting into a through slot made in the stationary part of the frame and having a shape corresponding to the shape of the projection; and an air-operated cylinder housed in a recess made in the stationary part of the frame underneath the through slot and communicating therewith by means of a passage through which the cylinder's piston rod extends, an opening being made in the projection with a shape corresponding to the shape of the piston rod's outer end, which is kept in said opening while the winding of the pole coil takes place.

It is advisable that the device for locking the second toothed half-ring, mounted on the stationary part of the frame, be made in the form of an air-operated cylinder, and the half-ring be provided with an opening on its face surface wherein the outer end of the cylinder's piston rod is held to lock the half-ring relative to the stationary part of the frame.

It is expedient that the device for locking the first toothed half-ring, mounted on the movable part of the frame, be made in the form of an air-operated cylinder with the outer end of its piston rod being shaped in accordance with the space between the teeth on the half-ring, the outer end of the piston rod engaging with the teeth of said half-ring to lock it relative to the traverse.

It is also expedient that a device for tensioning the insulating tape to be wound from each bobbin be mounted on the face surfaces of the toothed half-rings, each device being kinematicaly interconnected with a respective bobbin by means of a toothed disc rigidly fixed to the face surface of the respective bobbin.

It is expedient that each device for tensioning the insulating tape to be wound include a casing; a shaft rotatably mounted in the casing; a brake disc with two projections made on the face surface thereof, the brake disc being placed in the casing on said shaft and being adapted to rotate thereon; a toothed disc located in the casing and adapted to rotate on said shaft; a projection being made on a face surface of said toothed disc, a spring, one end of which is secured to the brake disc; and the other to the projection of the toothed disc, friction inserts mounted in the casing and spring-loaded to the brake disc; and a nut threaded onto the casing for adjusting the braking pressure, the toothed disc being in engagement with the toothed disc of the corresponding bobbin.

It is also expedient that the machine have a boom, one end of which is hinged at the end of the overhang carrying the movable part of the frame; an electric drive to lift a pole coil installed at said end of the boom; and a gripper mounted on the other end thereof for placing and removing the pole coil.

The winding machine according to the invention makes it possible to improve the quality of insulation on a pole coil to use adhesive as well as non-adhesive tapes for winding, to wrap coils with several tapes simultaneously, and to mechanize the process of loading and removal of pole coils from the machine.

An embodiment of the invention will now be described by way of example with reference to the accompanying drawing in which.

Figure 1:
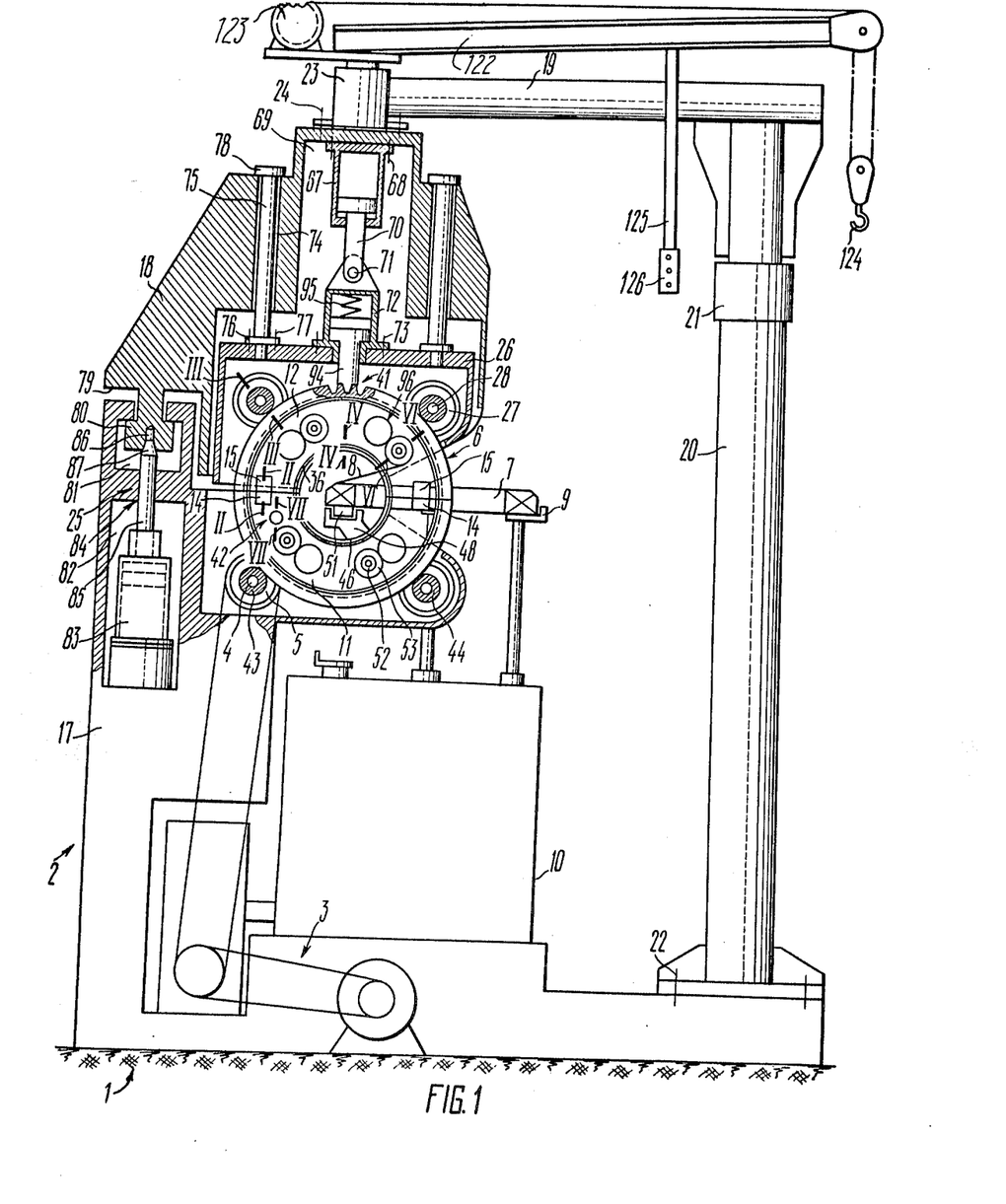
FIG. 1 is a front elevational view, partially in section of the machine for winding tape body insulation on pole coils according to the invention.

Referring to the drawings, the machine for winding tape body insulation on pole coils of electric machines has a frame 2 (FIG. 1). The frame, fixed on a foundation 1, carries an electric drive 3.

The drive 3 is kinematically interconnected with the shaft 4 of a driving gear 5. The drive 5 drives a winding device 6 mounted on the frame 2, which serves to wrap a pole coil 7 with insulation. An insulating tape 8 is used as insulation with the device 6.

The machine also has a unit 9 for holding the pole coil 7 to be wound in position and a unit 10 for rotation of the coil. The unit 10 is driven from the electric drive 3. The units 9 and 10 are made in the present embodiment of the machine as described in U.S. Pat. No. 2,793,817.

Figures 2, 3:
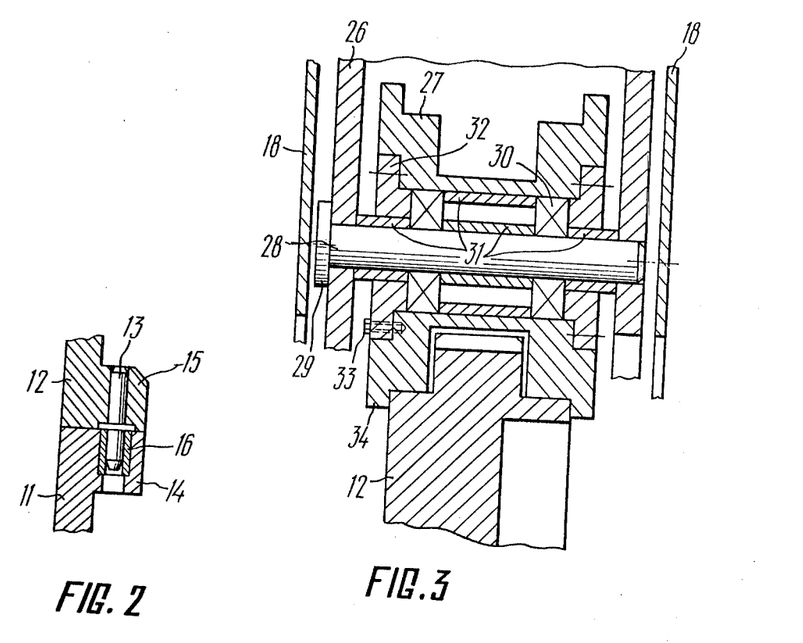
FIG. 2 shows the device for locking the toothed half-rings according to the invention in a cross sectional view taken along the line II—II of FIG. 1.
FIG. 3 shows a roller for interacting with a tooth half-ring in a cross sectional view taken along the line III—III of FIG. 1.

The winding device 6 is made in the form of two toothed half-rings 11 and 12 detachable from each other, the teeth being placed on the cylindrical peripheral surface of the half-rings. The half-ring 11 is locked with respect to the half-ring 12 by means of two lock pins 13 (FIG. 2). To this end, a pair of bosses 14 and 15 are made on each half-ring 11 and 12, respectively. Centering bushings 16 are fitted in the bosses 14 of the half-ring 11, and lock pins 13 are pressed in the respective bosses 15 of the half-ring 12. The frame 2 (FIG. 1) is made of two parts 17 and 18. The part 17 is rigidly fixed on the foundation 1, and the part 18 is movable relative to the stationary part 17 by means of an overhang 19. The overhang is hinged on a support 20 by means of a cylindrical joint 21. The support 20 is secured to the stationary part 17 of the frame 2 by means of bolts (not shown) disposed along the typically illustrared bolt centerlines 22. In the present embodiment, the support 20 is made in the form of a cylindrical column. The movable part 18 of the frame 2 is rigidly fixed to the end 23 of the overhang 19 with the aid of bolts (not shown) disposed along typical centerlines 24.

The machine is provided with a device 25 for locking the movable part 18 with respect to the stationary part 17 of the frame. In the present embodiment of the invention, the device 25 is mounted on the stationary part 17 of the frame and is operative while the winding of the insulating tape on the pole coil 7 takes place.

A yoke-shaped traverse 26 is displaceably installed on the movable part 18 of the frame. The traverse carries a pair of rollers 27 intended to interact with the toothed half-ring 12 mounted on the traverse 26.

Each of the rollers 27 (FIG. 3) is secured on a stationary axle 28, which is fixed to the traverse 26 by means of screws (only one shown) suitably of the flathead type 29 and disposed aong the centerline of the axle 28. The roller 27 is mounted on the axle 28 with the aid of bearings 30, spaced apart by means of spacer sleeves 31 and two flanges 32, which are fastened to the roller 27 with screws 33 (only one shown) disposed along typical centerlines. The roller 23 is provided with two shoulders 34 designed to prevent axial shift of the toothed half-ring 12.

Figure 4:
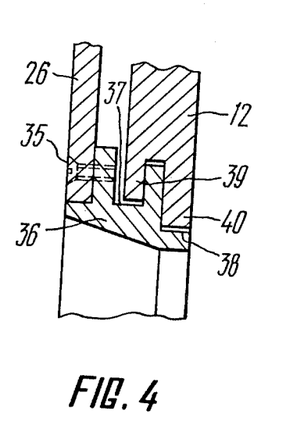
FIG. 4 shows a supporting ring for mounting a toothed half-ring on the movable traverse in a cross sectional view taken along the line IV—IV of FIG. 1.

To prevent radial displacement of the half-ring 12 (FIG. 4) from occuring at the moment that the half-rings 11 and 12 are detached, a half-ring 36 is installed on the traverse 26 (FIG. 4) with the help of screws 35. The half-ring 36 has two cylindrical grooves 37 and 38 on its periphery, which receive the corresponding cylindrical shoulders 39 and 40 made on the peripheral surface of the toothed half-ring 12.

A device 41 for locking the half-ring 12, and a device 42 for locking the half-ring 11 are arranged on the movable part 18 and stationary part 17 of the frame 2, respectively. The devices 41 and 42 lock the half-rings 11 and 12 once the winding of the pole coil 7 is completed.

A second pair of rollers 43 and 44 is fixed on the stationary part 17 of the frame 2. The roller 43 is mounted on the shaft 4 of the driving gear 5. The roller 44 is mounted on the stationary part 17 of the frame 2 similarly to the rollers 27.

Figure 5:
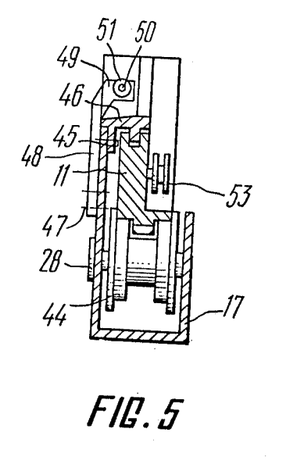
FIG. 5 shows an embodiment for mounting the roller for supporting the pole coil to be wound on the machine.

To prevent radial displacement of the toothed half-ring 11 when the half-ring 12 is detached therefrom, a half-ring 46 similar to the half-ring 36 (FIG. 4) is secured to the stationary part 17 of the frame 2 by means of screws (not shown) disposed along typical centerlines 45 (FIG. 5).

A bracket 48 is installed on the stationary part 17 (FIG. 5) of the frame 2 by means of bolts (not shown) disposed along typical centerlines 47. Secured to the end 49 of the bracket 48 is a pin 50 whereon a roller 51 is rotatably mounted. This roller, intended for additional support of the pole coil 7 (FIG. 1), is arranged so that it holds the coil 7 directly in working area.

In the present embodiment of the invention, four pins 52 rotatably carrying four respective bobbins 53, loaded with the insulating tape 8, are fixed on the face surface of the toothed halfrings 11 and 12. The pin 52 (FIG. 6) is pressed into the hole 54 in the toothed half-ring 12. A shoulder 56 is made at the end 55 of the pin 52 to limit the length of the pin 52 which is inserted into the hole 54.

Figure 6:
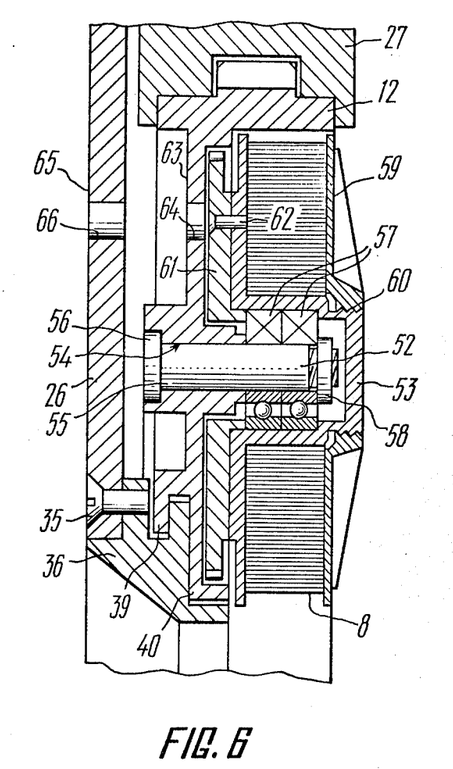
FIG. 6 shows a bobbin with the insulating tape wound thereon in a cross sectional view along the line VI—VI of FIG. 1.

The bobbin 53 is mounted on the pin 52 by means of two bearings 57 fixed with a nut 58. To prevent its slipping and coming off the bobbin during the operation, a roll of the insulating tape 8 is pressed in the bobbin 53 with a disc 59 which is mounted on the bobbin by means of thread 60. A toothed disc 61 is secured to the face surface of the bobbin 53 with screws 62. A hole 64 for screwing in or releasing a screw 62 with a tool, e.g. screwdriver, during the assembly or disassembly of the bobbins 53, is made on the face surface 63 of the toothed half-ring 12. A similar hole 66, also intended for the passage of a screwdriver, is made on the surface 66 of the yoke-shaped traverse 26.

An air-operated power cylinder 67 is installed inside a recess 69 in the movable 18 part of the frame with the help of bolts 68. A piston rod 70 of the cylinder 67 is rigidly connected to the traverse 26 through a cylindrical hinge 71 secured to the piston rod 70 and an air-operated cylinder 72 fixed on the traverse 26 by means of bolts (not shown) disposed along typical centerlines 73. The cylinder 67 is designed to displace the traverse 26 relative to the movable part 18 of the frame. In the movable part 18 of the frame two bores 74 are made wherein two guide rods 75 are fitted. Each guide rod 75 has at its end a shoulder 76 which is secured to the traverse 26 by means of bolts (not shown) disposed along typical centerlines 77, while the other end of each rod 75 is provided with a shoulder 78 serving to limit the displacement of the traverse 26.

The device 25 for locking the movable part 18 of the frame 2 with respect to the stationary part 17 incorporates a projection 80 on the face surface 79 of the frame's movable part 18. The projection fits into a through slot 81 made in the stationary part 17 of the frame 2 and corresponding to the projection 80 in shape. An air-operated cylinder 83 is mounted in a recess 82 made in the stationary part 17 of the frame 2 underneath the through slot 81. The recess 82 communicates with the slot 81 by means of a passage 84 through which the piston rod 85 of the cylinder 83 extends. An opening 86 corresponding in shape to the outer end 87 of the piston rod 85 is made in the projection 80. While the winding of the pole coil 7 is in progress, the end 87 of the piston rod 85 is held in the opening 86.

Figure 7:
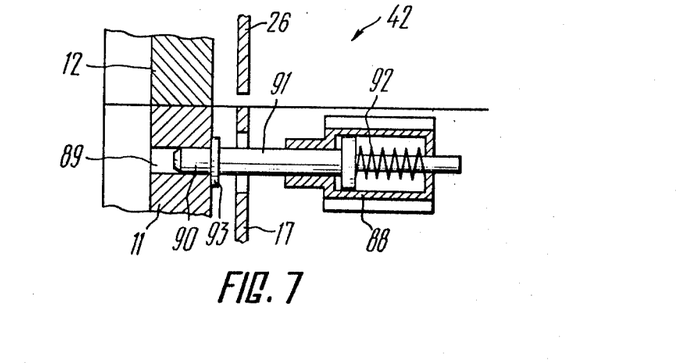
FIG. 7 shows the device for locking a toothed half-ring with respect to the stationary part of the frame in a cross sectional view taken along the line VII—VII of FIG. 1.

The device 42 for locking the toothed half-ring 11, arranged in the stationary part 17 of the frame 2, is made in the form of an air-operated cylinder 88 secured to the frame's stationary part 17 (FIG. 7). The half-ring 11 has an opening 89 in its face surface.

At the moment of locking the half-ring 11 relative to the frame's stationary part 17, the end 90 of the piston rod 91 enters the opening 89 in the half-ring 11 under the action of a spring 92. There is a shoulder 93 at the end 90 of the piston rod 91 to limit its travel.

The air cylinder 72 mounted on the yoke-shaped traverse 26 is used as the device 41 (FIG. 1) for locking the toothed half-ring 12. The outer end of its piston rod 94 corresponds in shape to the space between adjacent teeth of the half-ring. When locking occurs, the end 94 of the piston rod engages with a tooth space of the half-ring 12 under the action of a spring 95.

The machine is also provided with a device 96 for tensioning the insulating tape 8 to be wound. The device is aranged on the face surface of the half-ring 12. The number of the devices 96 is defined by the number of the bobbins 53 and is equal to four in the present embodiment of the invention. The devices 96 are kinematically interconnected with the respctive bobbins 53 by means of the toothed discs 61 (FIG. 6) rigidly fixed on the face surface of the bobbins 53.

Each device 96 (FIG. 8) for tensioning the tape 8 (FIG. 1) to be wound includes a casing 97 (FIG. 8) fixed on the face surface of the toothed half-ring 12 by means of screws (not shown) disposed along typical centerlines 98. A shaft 100 is journalled in an antifriction bearing 99 so as to rotate in the casing 97. A brake disc 102 is rotatably mounted on the shaft 100 by means of antifriction bearings 101. To prevent axial displacement of the brake disc 102 along the shaft 100, there are provided a snap ring 103 placed in the brake disc 102 and a spacer sleeve 104 placed on the shaft 100.

Figure 8:
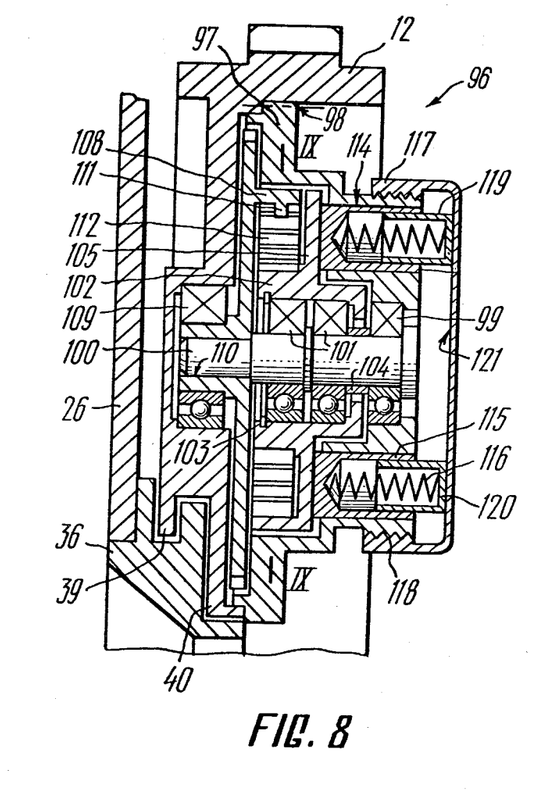
FIG. 8 shows an elevational view, partially in section, of the device for tensioning the tape to be wound.

Two projections 106 and 107 (FIG. 9) used to limit the angle of turning of a toothed disc 108 (FIG. 8) are made on the face surface 105 of the brake disc 102. The toothed disc 108 is mounted in the casing 97 and is adapted to rotate on a bearing 109. One end of the shaft 100 fits into a hole 110 made in the toothed disc 108 in alignment with the axis thereof. The face surface of the toothed disc 108 is provided with a projection 111 (FIG. 9) whereon one end of a spiral torsion spring 112 is fixed. The other end of the spring 112 is fastened in a slot 113 made on the brake disc 102. Four friction inserts 115, urged by springs 116 towards the brake disc 102, are mounted in holes 114 in the casing 97 (FIG. 8). The device 96 is also provided with a nut 117 mounted on the casiong 97 by means of thread 118. The nut 117 serves to adjust the braking pressure. Caps 119 fitted into the holes of the friction inserts 115 and contacting the surface 121 of the nut 117 with their face surfaces 120 define the elements that transmit the braking pressure.

The devices 96 for tensioning the insulating tape 8 to be wound (FIG. 1) are mounted on the face surfaces of the toothed half-rings 11 and 12 in such a way that the toothed discs 61 (FIG. 6) of the bobbins 53 and toothed discs 108 (FIG. 8) of the tensioning device 96 are in mesh.

To place and remove the pole coil 7 from the machine, one end of a boom 122, carrying an electric drive 123, is hinged on the end 23 of the overhang 19. The other end of the boom 122 carries a gripper 124. A pendant control station with push buttons 126 to control the electric drive 123 is connected to the boom 122 through a pendant 125.

The described machine for winding tape body insulation on the pole coils of electric machines operates in the following manner.

In the initial position, the movable part 18 (FIG. 1) of the frame 2 is swivelled aside from the stationary part of the frame 2. The toothed half-ring 12 is locked by the device 41 in such a way that the end of the rod 94 is held in a tooth space of the half-ring 12 under the action of the spring 95. Compressed air is fed to the cylinder 67 on the side of its piston rod, and the yoke-shaped traverse 26 is lifted up by means of the piston rod 70. The toothed half-ring 11 is locked by the device 42 so that the end 90 (FIG. 7) of the piston rod 91 is inserted into the opening 89 of the halfring 11. The electric drive 3 of the machine (FIG. 1) is switched off. Compressed air is fed to the machine.

To start the operation, the boom 122 is brought by means of the pendant 125 to a pile of pole coils 7 to be wound placed beside the machine within the reach of the boom. The electric drive 123 is actuated by a respective control button 126, the gripper or hook 124 takes a pole coil 7 and raises it to a height that allows its placing on the unit 9 for holding the pole coils in position. After the pole coil 7 is brought in position, the gripper 124 is lifted and moved aside. The movable part 18 of the frame 2 is then swivelled back to the frame's stationary part 17 so that the axis of the opening 86 in the projection 80 and that of the piston rod 85 of the air cylinder 83 are brought into alignment. Compressed air is delivered to the cylinder 83 of the locking device 25 on the side of its piston. Under the action of compressed air, the piston rod 85 moves and its end 87 enters the opening 86 in the projection 80, thus locking the movable part of the frame relative to its stationary part.

Compressed air is then delivered to the air cylinder 67 on the side of its piston. As a result, the piston rod 70 moves downwards, lowering the traverse 26, which causes the pins 13 (FIG. 2) of the toothed half-ring 12 to enter the respective bushings 16 in the toothed half-ring 11 (FIG. 2). The traverse 26 (FIG. 1) is displaced by means of the guide rods 75 in the bores 74 until the shoulders 78 of the rods 75, coming up against the corresponding surface of the frame's movable part 18, limit further displacement of the traverse 26. This displacement is selected so that the toothed half-rings 11 and 12 can be freely rotated on the rollers 27, 44, and 43. Compressed air is then directed to the cyllinder 72 on the side of the piston rod 94, the latter lifts up, and its end disengages the corresponding tooth space on the toothed half-ring 12. The travel of the piston rod is so selected that some gap is provided between the external diameter of the halfring 12 and the tip of the piston rod 94. At the same moment, the toothed half-ring 11 is released. To this end, compressed air is directed to the cylinder 88 on the side of its piston rod (FIG. 7). As this takes place, the piston rod 91 moves back, its end 90 retracts from the opening 89 in the half-ring 11 and stops clear of the face surface of the half-ring 11. Afterwards, the rolls of the insulating tape 8 are placed upon the bobbins 53 (FIG. 6). To do this, the discs 59 are previously removed from the bobins. They are then screwed on the bobbins 53 so that the tape rolls rotate with the bobbins as a whole rather than slip thereon. After that, the tension of the tape is adjusted by means of the nut 117 screwed on the casing 97, which displaces the caps 119. These caps press or release the springs 116, so transmitting the pressure to the friction inserts 115, which, cooperating with the surface of the braking disc 102, produce the necessary braking momentum thereon.

Figure 9:
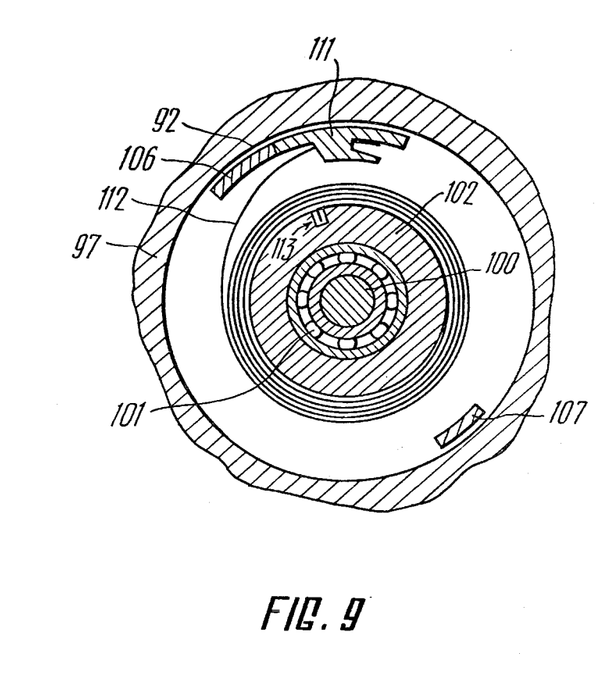
FIG. 9 is a cross sectional view taken along the line IX—IX of FIG. 8 of the device for tensioning the tape, according to the invention.

One end of the insulating tape 8 (FIG. 1) is then fixed to the pole coil 7 to be wound. For this purpose, the end of the isolating tape is drawn closer to the coil. Here, the bobbin 53, rotating on bearings 57 (FIG. 6) together with the toothed disc 61, revolves the toothed disc 108 (FIG. 8). As it turns clockwise, the toothed disc 108 twists the spiral spring 112 by its projection 111. The angle of rotation of the toothed disc 108 with respect to the braking disc 102 is defined by the relative angular position of the projections 106 and 107 (FIG. 9) on the braking disc 102 and is dependent on the required force for tensioning the tape 8 (FIG. 6) and the rigidity of the spring 112 (FIG. 8). When the disc 108 stops turning clockwise relative to the braking disc 102, the projection 111 of the disc 108 is up against the projection 107 (FIG. 9) of the braking disc 102 (FIG. 9). In further movement of the end of insulating tape 8 (FIG. 6), the toothed disc 61 rotates the toothed disc 108 (FIG. 8) whose projection 111 imparts rotation through the projection 107 to the braking disc 102. Here, the tension on the insulating tape 8 depends on the value of the braking momentum at the braking disc 102.

After the end of the insulating tape 8 is secured to the pole coil 7 (FIG. 1), the electric drive 3 is started, wherefrom rotation is transmitted through the driving gear 5 to the toothed half-rings 11 and 12. At the same time, the drive 3 drives through a corresponding kinematic chain the unit 10 for rotation of the pole coil being wound. In rotation of the toothed half-rings 11 and 12, the insulating tape 8 is wound away from the bobbin 53 upon the coil 7 with a specified pitch.

When the section area center of the coil 7 being wound is out of alignment with the rotation center of the toothed half-rings 11 and 12 no slack arises in the tape because the spiral ring 112 (FIG. 9) revolves the toothed disc 108 (FIG. 8) at some angle counter-clockwise, and the disc 108, in turn, revolves the tooth disc 61 (FIG. 6), so making up for the slack of the tape 8.

Once the winding is completed, the electric drive 3 is shut down. The insulating tape 8 is cut off and its end is fastened on the pole coil 7. If some more insulating layers need to be applied to the coil, the operation is repeated.

The machine also allows the winding of pole coils with several insulating tapes simultaneously, according to the number of the bobbins 53, arranged on the toothed half-rings 11 and 12. To this end, several ends of the insulating tape 8 from the respective bobbins 53 are fixed on the pole coil 7.

After the required number of layers of the insulating tape 8 is wound on the pole coil 7, the electric drive 3 of the machine is switched off. The air-operated cylinder 88 (FIG. 7) of the device 42 for locking the toothed half-ring 11 is connected with the atmosphere on the side of its piston rod 91. The end 90 of the latter comes up against the face surface of the half-ring 11 under the action of the spring 92. The half-ring 11 is then rotated by hand until the end 90 of the piston rod 91, urged by the springs 92, enters the opening 89. Once the half-ring 11 is locked, the cylinder 72 is connected with the atmosphere on the side of its piston rod. Under the action of the spring 95, the end of the piston rod 94 is introduced into a corresponding tooth space of the teeth on the half-ring 12. The cylinder 67 is communicated with the atmosphere on the side of its piston, and compressed air is fed to the cylinder's chamber on the side of its piston rod. The piston rod 70 moves upwards, carrying therewith the yoke-shaped traverse 26. This results in the retraction of the pins 13 (FIG. 2) out of the bushings 16 and detachment of the half-rings 11 and 12 from each other. After the traverse 26 is lifted up, the cylinder 83 is communicated with the atmosphere on the side of its piston, and compressed air is directed thereto on the side of its piston 85. The piston rod 85 moves downwards, and its end 87 withdraws out of the opening 86 in the projection 80. Thus, the movable part 18 of the frame 2 is released with respect to the stationary part 17. The frame's movable part 18 is then swivelled aside, and, as this takes place, the projection 80 comes out of the slot 81. The gripper 124 is advanced by means of the pendant 125 to the coil 7 held on the machine. The electric drive 123 is started by the corresponding control push button 126, and the gripper or hook 124 is lowered down to the pole coil 7. The drive 123 is then stopped. The electric drive 123 is started with the corresponding push button 126, and the pole coil is raised. The drive 123 is then stopped, and the boom 122 is directed by means of the pendant 125 to the store of wound pole coils 7.

The next operating cycle follows as described hereinbefore.

The present machine for winding tape body insulation on the pole coils of electric machines provides for improved quality of insulation, increased output, use of both non-adhesive and adhesive insulating tapes, winding of coils with several tapes simultaneously, and mechanized placing and removal of the coil from the machine.

What we claim is:

1. A machine for winding tape body insulation on the pole coils of electric machines, comprising: a frame mounted on a foundation and consisting of a stationary part and a movable part, the stationary part of the frame being rigidly fixed to the foundation; a support fastened on said stationary part of the frame; an overhang hinged on said support, the movable part of the frame being rigidly fixed to said overhang so as to be movable relative to said stationary part of the frame; an electric drive mounted on the stationary part of the frame; a winding device for applying insulation to a pole coil made in the form of two toothed half-rings detachable from each other, the first of said half-rings being placed on said movable part of the frame, and the second being placed on said stationary part of the frame; a driving gear to drive said winding device, a shaft on which said driving gear is mounted being kinematically interconnected with said electric drive; a unit for holding the pole coil to be wound in position mounted on said stationary part of the frame; a unit for rotation of the pole coil mounted on said stationary part of the frame; a locking device for holding said stationary and movable parts of the frame together while the winding of the insulating tape is in progress, said locking device being placed on one of said parts of the frame and interacting with the other part of the frame; a yoke-shaped traverse mounted on said movable part of the frame and adapted to be displaced thereon; a first pair of rollers mounted on said yoke-shaped traverse, the first toothed half-ring being mounted on said traverse and interacting with said first pair of rollers; a device for locking said first half-ring once the winding of insulating tape on the pole coil is completed, said device being placed on the movable part of the frame; a device for locking said second toothed half-ring upon the completion of winding, said device being placed on the stationary part of the frame; a second pair of rollers mounted on said stationary part of the frame, one roller of said second pair of rollers being mounted on the shaft of said driving gear, said second toothed half-ring being rotatable on said pair of rollers; at least one pin fastened on the face surface of at least one of said toothed half-rings; and a bobbin with insulating tape rotatably mounted on each of said pins.

2. The machine claimed in claim 1, further comprising an air-operated power cylinder installed on said movable part of the frame for displacing said yoke-shaped traverse relative to said movable part of the frame, said cylinder having a piston rod rigidly connected to said traverse.

3. The machine claimed in claim 1, wherein said locking device for holding said stationary and movable parts of the frame together includes: a projection made on a face surface of said movable part of the frame; a through slot made in said stationary part of the frame and having a shape corresponding to the shape of said projection; a recess made in said stationary part of the frame underneath said through slot; a passage made in the bottom of the through slot to connect said slot and said recess; an air-operated power cylinder with a piston rod, the cylinder being housed in said recess and the piston rod extending through said passage; and an opening made in said projection with a shape corresponding to the shape of the outer end of the piston rod, said outer end of the piston rod being held in said opening while the winding of the pole coil takes place.

4. The machine claimed in claim 1, wherein said device for locking said second toothed half-ring, placed on said stationary part of the frame, includes: an air-operated power cylinder with a piston rod, the cylinder being installed on said stationary part of the frame; and an opening in the face surface of said second toothed half-ring, the outer end of the piston rod of said cylinder being held in said opening to lock said second toothed half-ring relative to said stationary part of the frame.

5. The machine claimed in claim 1, wherein said device for locking said first toothed half-ring, placed on said yoke-shaped traverse, includes an air-operated power cylinder with a piston rod, the cylinder being installed on said movable part of the frame, the outer end of the piston rod being shaped in accordance with the space between the teeth of said half-ring and engaging with the teeth of said toothed half-ring to lock said first half-ring relative to said traverse.

6. The machine claimed in claim 1 further comprising a boom; an electric drive mounted on an end of said boom, said end of the boom being hinged on the end of said overhang carrying said movable part of the frame; and a gripper mounted on the other end of the boom for placing and removing the pole coil, said gripper being driven by said electric drive.

7. A machine for winding tape body insulation on the pole coils of electric machines comprising: a frame installed on a foundation and consisting of a stationary part and a movable part, the stationary part of the frame being rigidly fixed to the foundation; a support fastened on said stationary part of the frame; an overhang hinged on said support, the movable part of the frame being rigidly fixed to said overhang so as to be movable relative to said stationary part of the frame; an electric drive mounted on the stationary part of the frame; a winding device for applying insulation to a pole coil made in the form of two toothed half-rings detachable from each other, the first of said half-rings being placed on said movable part of the frame, and the second being placed on said stationary part of the frame; a driving gear to drive said winding device, a shaft on which said driving gear is mounted being kinematically interconnected with said electric drive; a unit for holding the pole coil to be wound in position mounted on said stationary part of the frame; a unit for rotation of the pole coil mounted on said stationary part of the frame; a locking device for holding said stationary and movable parts of the frame together while the winding of the insulating tape is in progress, said locking device being placed on one of said parts of the frame and interacting with the other part of the frame; a yoke-shaped traverse mounted on said movable part of the frame and adapted to be displaced thereon; a first pair of rollers mounted on said yoke-shaped traverse, the first toothed half-ring being mounted on said traverse and interacting with said first pair of rollers; a device for locking said first half-ring once the winding of insulating tape on the pole coil is completed, said device being placed on the movable part of the frame; a device for locking said second toothed half-ring upon the completion of winding, said device being placed on the stationary part of the frame; a second pair of rollers mounted on said stationary part of the frame, one roller of said second pair of rollers being mounted on the shaft of said driving gear, said second toothed half-ring being rotatable on said pair of rollers; at least one pin fastened on the face surface of at least one of said toothed half-rings; a bobbin with insulating tape rotatably mounted on said pin; at least one device for tensioning the insulating tape to be wound from each bobbin mounted on the face surface of at least one of said toothed half-rings, there being one device for tensioning adjacent to each of said bobbins; and a toothed disc rigidly secured to a face surface of each of said bobbins and being kinematically interconnected with the device for tensioning the insulating tape adjacent to its respective bobbin.

8. The machine claimed in claim 7, wherein each of said devices for tensioning the tape to be wound includes: a casing; a shaft rotatably mounted in said casing, a brake disc placed in said casing and being rotatably mounted on said shaft; two projections made on a face surface of said brake disc; a toothed disc placed in the casing and adapted to rotate about said shaft, this toothed disc being in mesh with the toothed disc of the respective bobbin; a projection made on the face surface of said toothed disc and facing said face surface of the brake disc; a spring with one end thereof being fastened to said brake disc and the other end to said projection on the toothed disc; two friction inserts placed in said casing; two springs mounted in the casing for urging the respective friction inserts towards said brake disc; and a not for adjusting the braking pressure mounted on said casing by a threaded means.

* * * * *

UNITED STATES PATENT OFFICE
CERTIFICATE OF CORRECTION

PATENT NO. : 4,093,131
DATED : June 6, 1978
INVENTOR(S) : Balyko, Georgy Semenovich, et al It is certified that error appears in the above-identified patent and that said Letters Patent are hereby corrected as shown below:

In No. 30 concerning the Application Priority Data, the third date should read March 15, 1976 and not March 15, 1975.

Signed and Sealed this

Seventeenth Day of July 1979

[SEAL]

Attest:

Attesting Officer

LUTRELLE F. PARKER
*Acting Commissioner of Patents and Trademarks*